United States Patent [19]

Smither

[11] 3,938,129
[45] Feb. 10, 1976

[54] POWER LINE DATA TRANSMISSION SYSTEM
[75] Inventor: Miles A. Smither, Harris, Tex.
[73] Assignee: General Electric Company, Fairfield, Conn.
[22] Filed: Aug. 21, 1974
[21] Appl. No.: 499,363

[52] U.S. Cl. .............................. 340/310 R; 340/170
[51] Int. Cl.² ........................................ H04M 11/04
[58] Field of Search.......... 340/310 A, 310 R; 307/3

[56] References Cited
UNITED STATES PATENTS
| | | | |
|---|---|---|---|
| 2,029,542 | 2/1936 | Polin | 340/310 A |
| 3,714,451 | 1/1973 | Whitney | 340/310 R |
| 3,815,119 | 6/1974 | Finlay | 340/310 R |

FOREIGN PATENTS OR APPLICATIONS
| | | | |
|---|---|---|---|
| 1,125,340 | 10/1956 | France | 340/310 A |

Primary Examiner—Thomas B. Habecker
Attorney, Agent, or Firm—Raymond H. Quist; Allen E. Amgott

[57] ABSTRACT

A power line data transmission system is disclosed in which data is transmitted over a line carrying alternating current power by varying or modulating the power factor of the line or the phase angle of the power on the line in accordance with a signal to be transmitted. A series connected reactance and switch are connected across the line. The switch is turned on and off in response to the data signal to be transmitted over the line. The phase angle of the voltage and current on the line is detected at the receiving location. The phase relation between the voltage and the current is detected or compared to produce a binary digital signal corresponding to the data sent over the line. The detection of the voltage and current being out of phase by a predetermined amount may be used to generate a signal indicating a digital one. The detection of the voltage and current being in phase may be used to generate a signal corresponding to a digital zero.

13 Claims, 4 Drawing Figures

POWER LINE DATA TRANSMISSION SYSTEM

RELATED APPLICATION

This invention relates to a power line data transmission system which may be used in transmission of data from within bore holes and is disclosed in co-pending application Ser. No. 499,361, entitled Data Transmission System which is assigned to the assignee of the present invention.

BACKGROUND OF THE INVENTION

The present invention relates to a power line data transmission system. More particularly, the present invention relates to a data transmission system in which data may be transmitted over a line by modulating the power factor of the line, or in other words modulating or varying the phase angle between the voltage and the current on the line.

It has been known to transmit data over a power line by use of frequency displacement techniques. That is, it has been known to transmit data over a power line by modulating the power on a power cable with a high frequency carrier waveform containing the data.

The present invention may be used to transmit data between any two locations which are connected by a power line or cable. The present invention has found a significant use in transmitting data from the depths of oil well bore holes and other bore holes used in oil well exploration. However, the present invention may also be used in other applications to transmit data from one location to another.

SUMMARY OF THE INVENTION

The present invention provides a method and apparatus of transmitting digital data over a conductor which is simultaneously providing alternating current power to a load. The method and apparatus of the present invention is carried out by modulating the power factor of the line system; i.e., modulating or varying the phase angle between the current and voltage on the line.

An advantage of the present invention is that additional lines are not required for data transmission where a power line is already in existence. This advantage results in reduced costs for additional lines. Furthermore, the power line is usually of heavier construction than a communications data line and therefore is less subject to breakage in industrial applications. This results in increased reliability of the system.

Another advantage of the present invention is that data may be transmitted over the power line without altering the voltage waveform at the load.

Another advantage of the present invention is that the transmitter does not dissipate any real power.

Briefly, in accordance with the present invention, a method and apparatus is provided for transmitting data over a line carrying alternating current power by varying the phase angle between the voltage and the current of the line. The phase angle between the voltage and the current of the line is varied between a first and a second predetermined phase angle value in response to a data signal to be transmitted. The first phase angle value represents a first signal condition transmitted over the line. The second phase angle value represents a second signal condition transmitted over the line. Means for detecting the phase angle of the voltage and the current on the line at a receiving location is provided. The detected phase angle of the voltage and the current is fed to means for providing a first signal in response to detecting a first predetermined value of phase angle between the voltage and the current and a second signal in response to detecting a second predetermined value of phase angle between the voltage and the current.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

Figure 1:
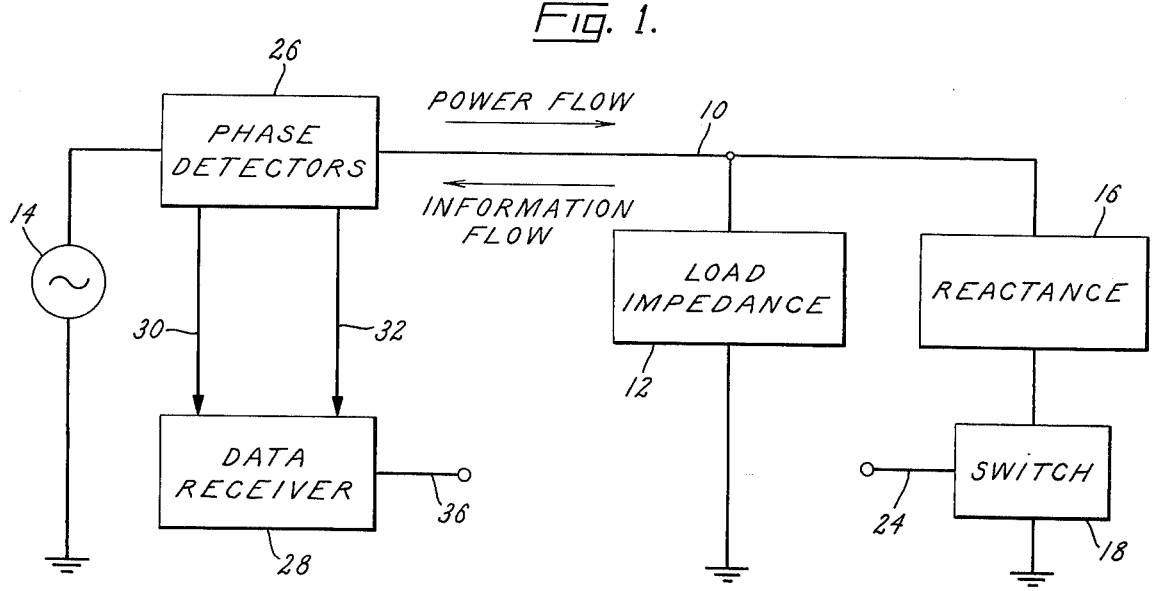
FIG. 1 is a schematic diagram, in block diagram form for an apparatus in accordance with the present invention.

DETAILED DESCRIPTION OF THE PREFERRED EMBODIMENTS:

Referring now to the drawings in detail wherein like numerals indicate like elements, there is shown in FIG. 1 a line 10 which may be an alternating current power line or cable. A load impedance 12 is connected across the line. The line 10 may of course consist of a pair of conductors with load impedance 12 connected across the two conductors or it may use the conventional representation of a ground return with the low side of the line connected to ground. The load impedance 12 may preferably be a load having a power factor substantially equal to one; i.e., the load 12 may preferably be comprised of a pure resistance. However, it is not necessary that the load impedance 12 be a pure resistance. The load impedance 12 may have any predetermined power factor. In such a case, the data transmitted by the power factor modulation of the present invention would be varying the power factor about the power factor of the load impedance. Thus, if load impedance 12 had a power factor of 0.5, the transmission of a digital zero could correspond to the line having a power factor of 0.5 and the transmission of a digital one could correspond to the line having a power factor of 0.7.

Alternating current power is applied to line 10 by alternating current power source 14.

The transmitter of the power line data transmission system of the present invention is comprised of reactance 16 and switch 18. Reactance 18 may be comprised of a capacitor, an inductor or any other type of component or device which produces a net reactive effect across its terminals. For example, although not preferred in the present embodiment of the invention, an electrical motor having inductive characteristics across its terminals may be used as the reactance in a particular application.

Switch 18 is connected in series with reactance 16 and the series combination of reactance 16 and switch 18 are connected across the line 10 and in parallel with load impedance 12. Switch 18 may be any suitable type of switch or switching circuit. For example, but not by way of limitation, switch 18 may be an electronic switching circuit, a magnetic reed switch, an electromagnetic relay or even a mechanically operated microswitch.

The closing of switch 18 electrically places reactance 16 across line 10 and in parallel with load impedance 12. This causes a predetermined change in the power factor of line 10 or in other words a predetermined change in the phase angle between the voltage and the current of line 10. The opening of switch 18 returns the power factor of the line 10 to its initial condition and also restores the phase angle relationship between the voltage and current of line 10 to its original condition. If reactance 16 is a pure reactance, no real power is dissipated by the transmitter. If the power factor of load impedance 12 is approximately one, that is the current and voltage through load impedance 12 being in phase, the closing of switch 18 placing reactance 16 across the line creates a component of the current wave form which is orthogonal to the load current wave form. This orthogonal component carries the information over line 10.

Figure 4:
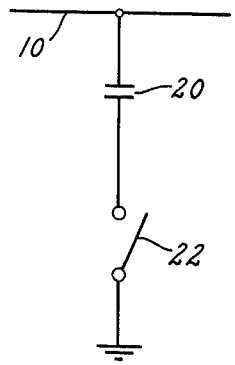
FIG. 4 is a schematic diagram of one embodiment of a data transmitter in accordance with the present invention.

Referring briefly to FIG. 4, there is shown a preferred embodiment of the reactance of the transmitter. In FIG. 4, capacitor 20 is connected in series with switch 22 across line 10; i.e., between line 10 and a ground return path. As described in the co-pending application of M. A. Smither and L. A. Trowbridge, referred to above, the present invention may be used in an application of transmitting data from within an oil well bore hole on a 20,000 foot power cable supplying sixty Hertz power to an instrument package located in the bore hole. A specific example by way of illustration, but not by way of limitation, is the use of a two microfarad capacitor as capacitor 20 where the load impedance across the line consumes 20 watts of power when operated at 117 volts R.M.S. at 60 Hertz. In this example, a phase angle change or modulation between the voltage and the current of 27 electrical degrees was achieved upon the closing of the switch. In such an application, by convention, a change of 27 electrical degrees may be used to indicate the transmission of a digital data one. Assuming a load impedance having a power factor of approximately one, the current and voltage being in phase or in other words having a phase angle value of zero degrees may be used to indicate the transmission of a digital data zero. However, it is apparent that the opposite convention may be used. It is also apparent that if the load impedance does have a power factor of some value other than one, the modulation caused by reactance 20 on line 10 may be used to vary the power factor about the power factor provided by the load in response to the digital data signal to be transmitted.

Referring now to FIG. 1, the digital data signal is applied to terminal 24 of switch 18. Switch 18 operates in response to the data on terminal 24. For example, switch 24 may be connected so that it will close the circuit between reactance 16 and ground in response to the application of a digital one to terminal 24. Likewise, the application of a digital zero to terminal 24 will open the circuit between reactance 16 and ground.

The data transmitted over line 10 may be received at a receiving location at any point along the line 10. Phase detectors 26 and data receiver 28 are provided at the receiving location. Phase detectors 26 are used to detect the phase of the current and voltage on line 10. Any suitable type of phase detectors may be used. A signal representing the phase of the voltage may be applied to data receiver 28 via line 30. A signal representing the phase of the current may be applied to data receiver 28 via line or lines 32. The output of data receiver 28 may be a digital one or zero appearing on output terminal 36. Equivalent input and output lines of various embodiments of the data receiver are similarly labeled in FIGS. 2 and 3.

It is to be understood that the receiving location and the transmitting location as indicated in FIG. 1 could be reversed. The transmitter could be located on line 10 near the alternating current power source 14 and the receiver could be located near the load impedance 12. It is also understood that the receiver and transmitter may be located at any point along the line 10. Furthermore, it is apparent and understood that the power line data transmission system of the present invention may be used for a two way communication system on a power line by the addition of a second transmitter and a second receiver. However, for the purpose of clarity, only a single transmitter and receiver are shown.

Figure 2:
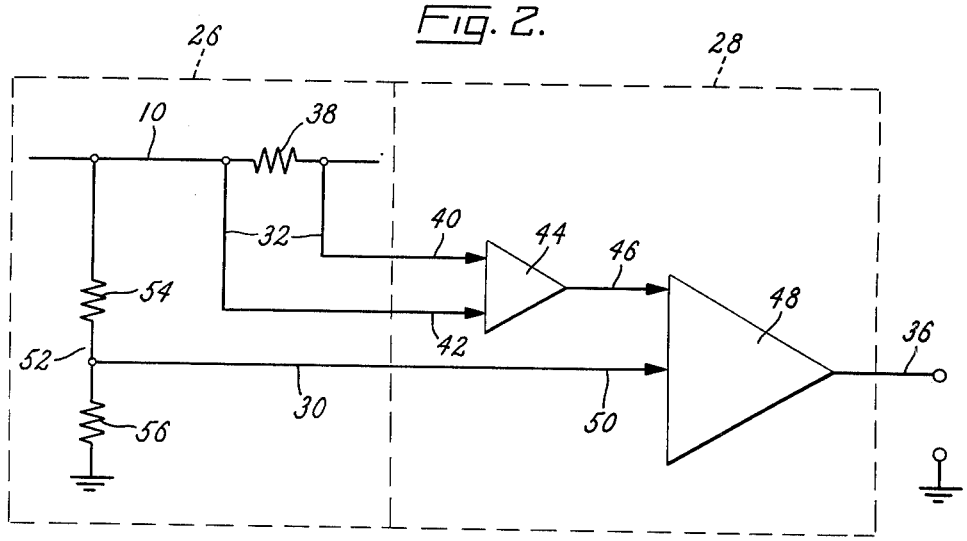
FIG. 2 is a schematic diagram of the phase detectors and a data receiver in accordance with the present invention.

Referring now to FIG. 2, there is shown one embodiment of phase detectors 26 and data receiver 28. However, it is understood that various other embodiments may be used. For example, various circuits and instruments are commercially available for detecting or measuring the phase angle between voltage and current on a power line and also for measuring the power factor. A power factor meter is commercially available which is a combined ammeter, volt meter and watt meter which indicates the value of the power factor.

Referring back to FIG. 2, there is shown a resistor 38 connected in series with line 10. The resistor 38 may be a small value resistance. The signal developed across resistor 38 is applied via inputs 40 and 42 to amplifier 44. The output of amplifier 44 is applied to input 46 of difference amplifier 48. The second input 50 of difference amplifier 48 is supplied from a voltage divider network 52 connected across line 10 comprised of resistors 54 and 56. Resistor 54 may be large in comparison to resistor 56. For a case where the voltage and current on line 10 are in phase, the signals on inputs 46 and 50 of differential amplifier 48 would be of equal amplitude and in phase. Therefore, the output of difference amplifier 48 on output terminal 36 would be zero. If the voltage and current on line 10 are out of phase, a voltage output will be produced on output terminal 36 of difference amplifier 48.

If load impedance 12 has a significant reactive component, in other words, the power factor of the load impedance is other than one, a first predetermined output level on output terminal 36 of difference amplifier 48 may correspond to a digital zero and a second predetermined signal output level on output terminal 36 of difference amplifier 48 may correspond to a digital data one. This may be accomplished by conventional circuits such as threshold detector circuits or direct current offset compensating means. It will be apparent to those skilled in the art that various other forms of suitable circuitry may be used.

Figure 3:
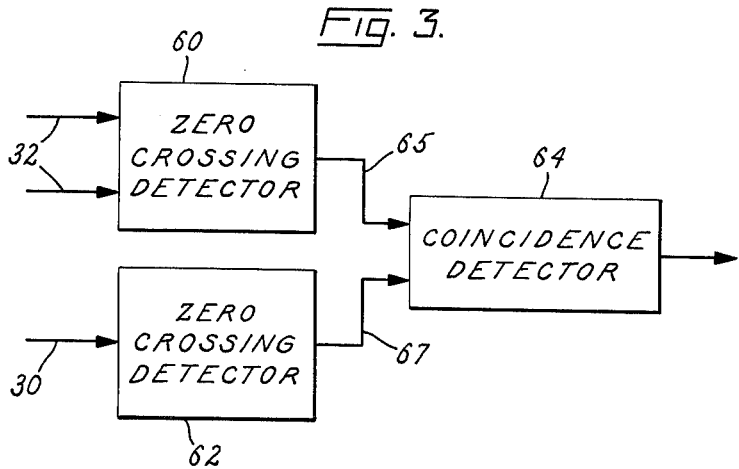
FIG. 3 is a block diagram of an alternate embodiment of the phase detectors and data receiver of the present invention.

Referring now to FIG. 3 there is shown another embodiment of a data receiver 28. There is shown in FIG. 3, zero crossing detectors 60 and 62. The lines providing inputs to zero crossing detectors 60 and 62 are labeled in accordance with FIG. 1. Zero crossing detector 60 detects the time of the zero crossings of the current on line 10 and supplies an input to coincidence detector 64 via line 65. Zero crossing detector 62 detects the time of the zero crossings of the voltage on line 10 and supplies an input to coindidence detector 64 via line 67. If the voltage and current are in phase, coincidence detector produces an output signal indicating the transmission of a digital data zero, as described above. If the current and voltage are out of phase, coincidence detector 64 produces an output signal indicating the transmission of a digital data one.

In view of the above, various changes and modifications may be made to the structure disclosed herein within the spirit of the teachings of the present invention. It will be apparent to those skilled in the art that various other circuits may be used to modulate the power factor or phase angle between the voltage and current on a line carrying power. Furthermore, it will be apparent to those skilled in the art that various changes may be made in the circuitry for recovering the power factor or phase angle modulation from the line.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A method of transmitting data over a line carrying alternating current power, comprising the steps of:
    varying the phase angle between the voltage and the current of the line between a first and a second predetermined value in response to a data signal to be transmitted, said first phase angle value representing a first signal condition, said second phase angle value representing a second signal condition;
    detecting the phase angle between the voltage and the current on said line; and
    providing a first signal in response to detecting said first predetermined value of phase angle and a second signal in response to detecting said second predetermined value of phase angle.

2. A method in accordance with claim 1 wherein said step of varying the phase angle comprises the steps of applying a first predetermined value of reactance across the line to transmit a first signal and applying a second predetermined value of reactance across the line to transmit a second signal.

3. A method in accordance with claim 2 wherein said steps of applying predetermined values of reactance across the line include the steps of connecting a series connected reactance and switch across the line and operating said switch connected in series with said reactance in accordance with a data signal to be transmitted.

4. A method in accordance with claim 1 wherein said detecting step comprises the steps of monitoring the phase of the voltage and the phase of the current of the line and comparing said phases of said voltage and current to produce an output signal indicative of the transmitted data.

5. Apparatus for transmitting data over a line carrying alternating current power, comprising:
    means for varying the phase angle between the voltage and current of the line between a first and a second predetermined value in response to a data signal to be transmitted, said first phase angle value representing a first signal condition, said second phase angle value representing a second signal condition;
    means for detecting the phase angle of the voltage and the current on said line; and
    means for providing a first signal in response to detecting a first predetermined value of phase angle between the voltage and current of the line and a second signal in response to detecting a second predetermined value of phase angle between the voltage and current of the line.

6. Apparatus in accordance with claim 5 wherein said means for varying the phase angle comprises means for applying a first predetermined value of reactance across said line to transmit a first signal and a second predetermined value of reactance across said line to transmit a second signal.

7. Apparatus in accordance with claim 6 wherein said means for applying said reactance across said line comprises a series connected reactance and switch connected across the line, said switch being operable in response to a signal to be transmitted.

8. Apparatus in accordance with claim 7 wherein said reactance comprises a capacitor.

9. Apparatus in accordance with claim 8 wherein said series connected reactance and switch are connected across the line, and across a load, at the load end of the line.

10. Apparatus in accordance with claim 5 wherein said phase angle detecting means includes a resistance connected in series with the line, the voltage signal developed across said resistance being indicative of the phase of the current of the line.

11. Apparatus in accordance with claim 10 wherein said phase angle detecting means further includes a voltage divider resistance network connected across said line, the voltage signal developed across a portion of said voltage divider network being indicative of the phase of the voltage of the line.

12. Apparatus in accordance with claim 5 wherein said means for providing said first and second signals comprises first zero crossing detector means for detecting the zero crossing of a signal representing the phase of the current of the line and providing an output indicative thereof, and second zero crossing detector means for detecting the zero crossing of a signal representing the phase of the voltage on the line and providing an output indicative thereof, and coincidence detector circuit means receiving said outputs of said first and second zero crossing circuit detector means, said coincidence detector providing a first output signal in response to said zero crossings being coincident and a second output signal when said zero crossings are out of phase.

13. Apparatus in accordance with claim 5 wherein said means for providing said first and second signals comprises difference amplifier means, said difference amplifier means receiving the signals representing the phase of the current and voltage, said difference amplifier means providing a first signal when the voltage and current of the line are in phase and a second signal when the voltage and current of the line are out of phase.

* * * * *